(12) United States Patent
Chang (10) Patent No.: US 11,187,941 B2
(45) Date of Patent: Nov. 30, 2021

(54) BACKLIGHT MODULE AND DISPLAY DEVICE HAVING THE SAME

(71) Applicant: AmTRAN Technology Co., Ltd., New Taipei (TW)

(72) Inventor: Yuan-Chieh Chang, New Taipei (TW)

(73) Assignee: AmTRAN Technology Co., Ltd., New Taipei (TW)

(*) Notice: Subject to any disclaimer, the term of this patent is extended or adjusted under 35 U.S.C. 154(b) by 0 days.

(21) Appl. No.: 16/851,070

(22) Filed: Apr. 16, 2020

(65) Prior Publication Data
US 2021/0063821 A1 Mar. 4, 2021

(30) Foreign Application Priority Data
Aug. 29, 2019 (TW) .................................. 108131126

(51) Int. Cl.
*G02F 1/13357* (2006.01)
*G02F 1/1335* (2006.01)

(52) U.S. Cl.
CPC .. *G02F 1/133608* (2013.01); *G02F 1/133605* (2013.01); *G02F 1/133607* (2021.01)

(58) Field of Classification Search
CPC ......... G02F 1/133608; G02F 1/133605; G02F 1/133607
See application file for complete search history.

(56) References Cited

U.S. PATENT DOCUMENTS

| 2012/0327311 | A1* | 12/2012 | Kuromizu | ......... G02F 1/133608 348/739 |
| 2013/0194529 | A1* | 8/2013 | Chang | ................. G09F 13/0413 349/58 |
| 2016/0223726 | A1* | 8/2016 | Kwon | .................. G02B 5/0278 |
| 2019/0155102 | A1* | 5/2019 | Chang | ............... G02F 1/133608 |

FOREIGN PATENT DOCUMENTS

| TW | I361314 B | 4/2012 |
| TW | I366709 B | 6/2012 |
| TW | M490028 U | 11/2014 |
| TW | I538603 B | 6/2016 |

* cited by examiner

*Primary Examiner* — Andrew J Coughlin
*Assistant Examiner* — Jessica M Apenteng
(74) *Attorney, Agent, or Firm* — CKC & Partners Co., LLC (57) ABSTRACT

A backlight module of a display device includes a back plate, a light source, a reflector, a support pin, a diffuser, and an optical film. The light source is disposed on the back plate. The reflector is disposed on the back plate and has an opening. The support pin is located in the opening and on the back plate. The support pin includes a base, an abutting portion, and a transparent supporting portion. The transparent supporting portion is on the base. The abutting portion protrudes outward from the base and extends onto the reflector. The abutting portion and the base form a step structure. The diffuser is located on the transparent supporting portion. The optical film is located on the diffuser. The reflector is located between the abutting portion of the support pin and the back plate.

14 Claims, 8 Drawing Sheets

BACKLIGHT MODULE AND DISPLAY DEVICE HAVING THE SAME

CROSS-REFERENCE TO RELATED APPLICATION

This application claims priority to Taiwan Application Serial Number 108131126, filed Aug. 29, 2019, which is herein incorporated by reference in its entirety.

BACKGROUND

Field of Invention

The present invention relates to a backlight module and a display device having the backlight module.

Description of Related Art

There are two common lightening designs for liquid crystal display televisions on the market now, one is the direct-type backlight module and the other one is the edge-type backlight module. Since technology improves day by day and is now very sophisticated, how to provide the best displayed picture quality and reduce the price and the production cost of the liquid crystal display televisions at the same time is the critical issue of manufacturing the liquid crystal display televisions.

In the direct-type backlight modules, the diffusors are usually supported by the support pins. The typical support pins are manually fixed by screws and screw holes on the back plate of the liquid crystal display televisions, which may take lots of time and manpower. In addition, exterior ornamentations may need to be installed to cover the screw holes on the back plate in order to improve the appearance of the display device, which will also increase assembly time and cost.

Therefore, how to provide an improved design of the backlight module that can solve the aforementioned problem becomes an important issue of those in the industry.

SUMMARY

An aspect of the present invention is to provide a backlight module.

In some embodiments of the invention, a backlight module includes a back plate, a light source, a reflector, a support pin, a diffuser, and an optical film. The light source is disposed on the back plate. The reflector is disposed on the back plate and has an opening. The support pin is located in the opening and on the back plate. The support pin includes a base, an abutting portion, and a transparent supporting portion. The transparent supporting portion is on the base. The abutting portion protrudes outward from the base and extends onto the reflector. The abutting portion and the base form a step structure. The reflector is located between the abutting portion and the back plate. The diffuser is located on the transparent supporting portion. The optical film is located on the diffuser. The reflector is located between the abutting portion of the support pin and the back plate.

In some embodiments of the invention, the reflector is clamped by the abutting portion and is fixed on the back plate, and there is no adhesive material between the reflector and the back plate.

In some embodiments of the invention, the abutting portion of the support pin surrounds the base.

In some embodiments of the invention, the backlight module includes an adhesive layer disposed between the base and the back plate.

In some embodiments of the invention, the support pin further comprises a reflective layer, and the reflective layer is located on a surface of the base facing the back plate.

In some embodiments of the invention, the optical film is a light diffusing film or a prism film.

In some embodiments of the invention, the optical film is a composite film, and the composite film comprises a first prism layer and one of a dual brightness enhancement films (DBEF) layer, a second prism film layer, and a light diffusing film layer.

Another aspect of the present invention is to provide a display device.

In some embodiments of the invention, the display device includes a backlight module and a display panel. The backlight module includes a back plate, a light source, a reflector, a support pin, a diffuser, and an optical film. The light source is disposed on the back plate. The reflector is disposed on the back plate and has an opening. The support pin is located in the opening and on the back plate. The support pin includes a base, an abutting portion, and a transparent supporting portion. The transparent supporting portion is on the base. The abutting portion protrudes outward from the base and extends onto the reflector. The abutting portion and the base form a step structure. The diffuser is located on the transparent supporting portion. The optical film is located on the diffuser. The reflector is located between the abutting portion and the back plate. The optical film and the diffusor are located between the display panel and the support pin.

In some embodiments of the invention, the reflector is clamped by the abutting portion and is fixed on the back plate, and there is no adhesive material between the reflector and the back plate.

In some embodiments of the invention, the backlight module includes an adhesive layer disposed between the base and the back plate.

In some embodiments of the invention, the support pin further comprises a reflective layer, and the reflective layer is located on a surface of the base facing the back plate.

In some embodiments of the invention, the optical film is a light diffusing film or a prism film.

In some embodiments of the invention, the optical film is a composite film, and the composite film comprises a first prism film layer and one of a dual brightness enhancement films (DBEF) layer, a second prism film layer, and a light diffusing film.

In the aforementioned embodiments, since the abutting portion of the support pin and the base form a step structure, the abutting portion may directly compress the reflector and the reflector may be clamped by the abutting portion and the back plate when the support pin is fixed on the back plate. As a result, there is no need to use tape (e.g., twin tape) to attach the portion of the reflector that is clamped by the abutting portion with the back plate. Therefore, the amount of the tape below the reflector may be saved so as to reduce the cost.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
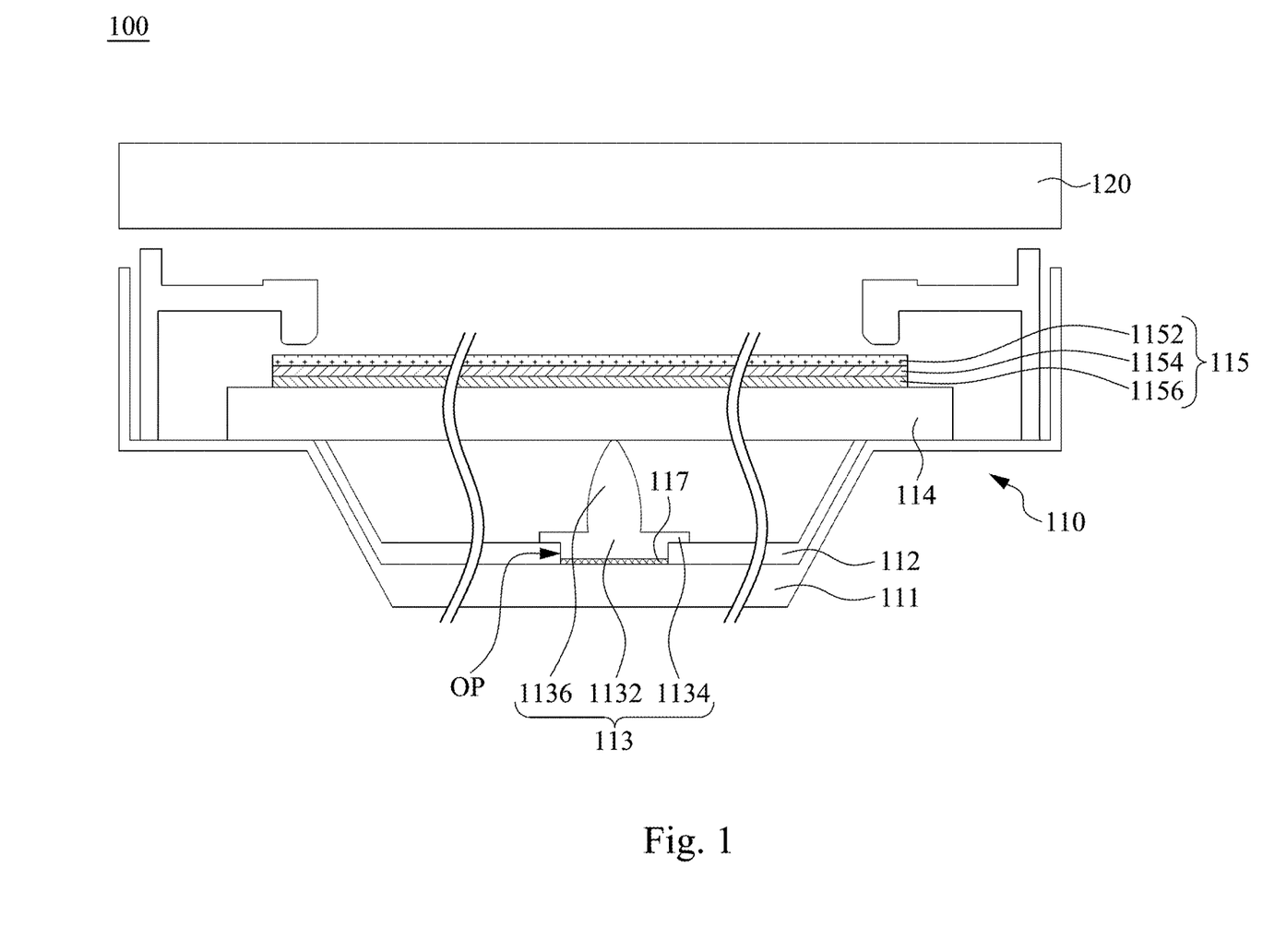
FIG. 1 is a cross-sectional view of a display device according to one embodiment of the present invention.
Figure 2:
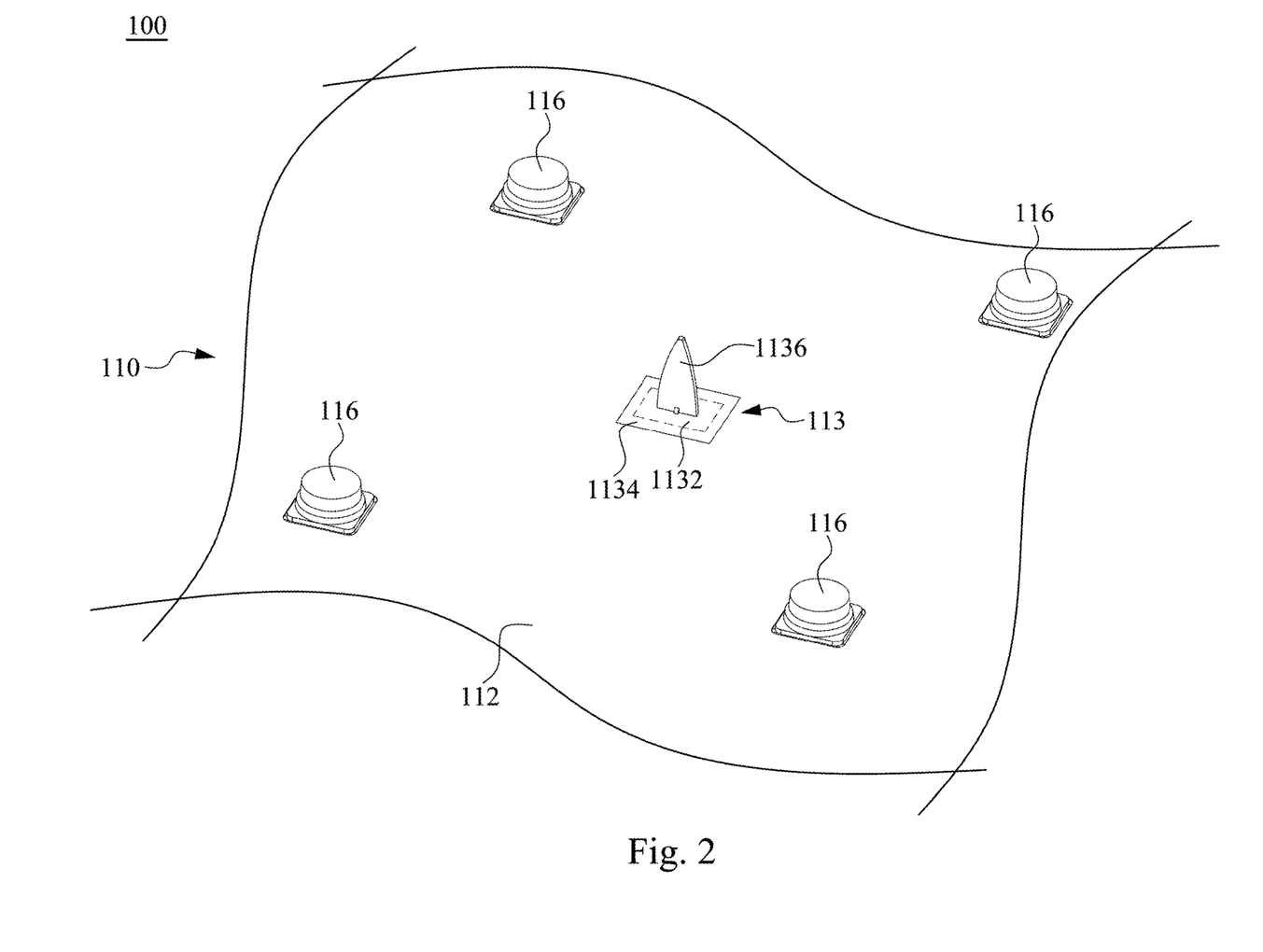
FIG. 2 is a partial perspective view of the display device in FIG. 1, and the diffusor and the optical film are omitted.

FIG. 1 is a cross-sectional view of a display device 100 according to one embodiment of the present invention. The display device 100 includes a backlight module 110 and a display panel 120. The backlight module 110 includes a back plate 111, a reflector 112, a support pin 113, a diffuser 114, and optical films 115. FIG. 2 is a partial perspective view of the display device 100 in FIG. 1, wherein the diffusor 114 and the optical films 115 are omitted in FIG. 2. In the present embodiment, the backlight module 110 is a direct-type backlight module. As shown in FIG. 2, the display device 100 includes a light source 116 disposed on the back plate 111 and is exposed from the reflector 112. In the present embodiment, the light source 116 is a light-emitting diode (LED). As shown in FIG. 2, the support pin 113 is surrounded by four light sources 116, but the present invention is not limited in the embodiment. Specifically, the bases of multiple light sources 116 are disposed on the light bars or light strips located between the back plate 111 and the reflector 112, such that the light sources 116 are arranged on the back plate 111. The lights emitted from the light sources 116 toward the back plate 111 can be reflected to the diffusor 114 by the reflector 112 so as to enhance the light utilization.

Reference is made to FIG. 1, the reflector 112 is located on the back plate 111 and has an opening OP. The support pin 113 is located in the opening OP and has a base 1132, an abutting portion 1134, and a transparent supporting portion 1136. The transparent supporting portion 1136 is located on the base 1132, and the abutting portion 1134 protrudes outward from the base 1132 and extends onto the reflector 112. The diffusor 114 is located on the transparent supporting portion 1136, and the optical films 115 are located on the diffuser 114. The display panel 120 is located on the backlight module 110, and the optical films 115 are located between the display panel 120 and the diffuser 114.

In an embodiment of the present invention, as shown by FIG. 1, the transparent supporting portion 1136 of the support pin 113 is a laminate structure, and the width of the transparent supporting portion 1136 is gradually decreased from the bottom, which connects the base 1132, to the top, which contacts the diffusor 114. The top of the transparent supporting portion 1136 is in contact with the diffusor 114 so as to support the weight of the diffusor 114 and the optical films 115. Thus, the position of the optical films 115 is fixed within the backlight module 110. A vertical projection of the abutting portion 1134 of the support pin 113 on the back plate 111 is overlapped with a vertical projection of the reflector 112 on the back plate 111. In other words, the reflector 112 is located between the abutting portion 1134 of the support pin 113 and the back plate 111. In an embodiment of the present invention, the support pin 130 is made of transparent material such that the light can pass through the support pin 130, which can prevent the undesired shadow showed on the display screen. However, the present embodiment is not limited in this regard, a skilled person may choose suitable material depend on the requirements.

As shown in FIG. 1, the backlight module 110 further includes an adhesive layer 117. The adhesive layer 117 is disposed between the base 1132 and the back plate 111 and is configured to fix the support pin 113 on the back plate 111. As a result, there is no need to set screw hole on the back plate 111, and the support pin 113 does not need to be fixed on the back plate 111 by a screw, either. Thus, the material cost of the screws, the labor work and assembling time to fix the support pins can be saved. Specifically, the compound of the adhesive layer 117 must be qualified to prevent the support pin 113 from peeling off. For example, TECH-NOMELT® PS 1573E or other adhesive providing sufficient strength of adhesion can be utilized to form the adhesive layer 117, so the strength of adhesion of the adhesive layer 117 will not be greatly weakened by time or temperature changes, and thus the support pin 113 will not be peeled off during the fabrication process or in the operation environment of the display device. In addition, there is no need to set holes on the back plate 111 of the backlight module 110 according to the embodiments of the present invention, which is different from the prior art having the back plate with screw holes set to fix the support pins, the present invention also improves the appearance of the display device 100 with the design of the back plate 111. The material costs of exterior ornamentation covering the screw holes on the back plate, the labor work and the assembling time to decorate the back plate in the prior art can also be saved.

In an embodiment of the present invention, the surface of the reflector 112 facing the abutting portion 1134 is directly in contact with the abutting portion 1134, wherein the abutting portion 1134 and the base 1132 of the support pin 113 form a step structure. When the support pin 113 is fixed on the back plate 111 by the adhesive layer 117, the abutting portion 1134 directly compresses the reflector 112 and part of the reflector 112 will be clamped by the abutting portion 1134 and the back plate 111. Since the reflector 112 is clamped by the abutting portion 1134 with the back plate 111, there is no need to use double-side tapes or adhesive to attach the reflector 112 on the back plate 111. In other words, there is no adhesive material between the reflector 112 and the back plate 111 in the embodiment of the present invention. Therefore, such structural design of the support pin 113 can reduce the amount of the double-sided tapes used to fix the reflector 112 in the prior art as well as the labor work and time spent on fixing the reflector on the back plate 111. The manufacturing cost is thereby reduced and the assembly efficiency is further improved.

In some embodiments of the present invention, the same support pins 113 are utilized in the display devices 100 with variable sizes, such as direct-type LCD televisions with screen sizes from 32 inches to 65 inches, however, the present invention is not limited in this regard. Different amounts of the support pin 113 can be utilized in the aforementioned display devices 100 with different screen sizes in order to support the optical films 115 evenly. For example, a display device 100 with a smaller size can utilize two support pin 113, wherein one support pin is set to support the left middle location of the optical film and the other is set to support the right middle location of the optical film, but the present invention is not limited in this regard.

Figure 3A:
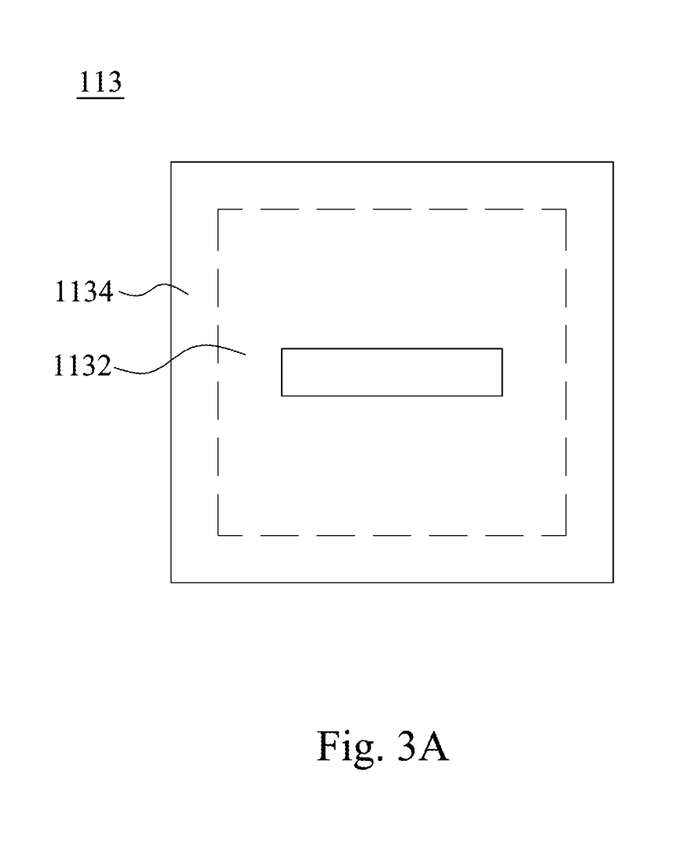
FIG. 3A is a top view of the support pin according to one embodiment of the present invention.
Figure 3B:
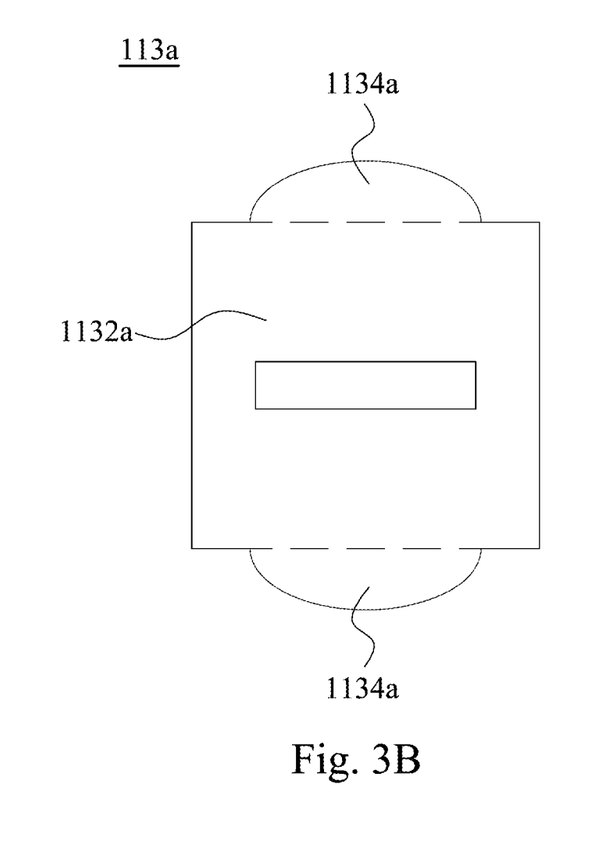
FIG. 3B is a top view of the support pin according to another embodiment of the present invention.

FIG. 3A is a top view of the support pin 113 according to one embodiment of the present invention. FIG. 3A is a top view of the support pin 113a according to another embodiment of the present invention. As shown in an embodiment of FIG. 3A, the abutting portion 1134 of the support pin 113 surrounds the base 1132 of the support pin 113. In the present embodiment of FIG. 3A, the shape of the abutting portion 1134 is in square, but the present invention is not limited in this regard. As shown in an embodiment of FIG. 3B, the abutting portion 1134a of the support pin 113a extends outwardly from two opposite sides of the base 1132a, but not surrounds the entire base 1132a. In the present embodiment of FIG. 3B, the shape of the abutting portions 1134a is semicircular, but the present invention is not limited in this regard, either. No matter what shape the abutting portion 1134 or portions 1134a are, the abutting portion 1134 or portions 1134a of the support pin 113a are required to be large enough such that the underlying reflector 112 can be clamped and fixed on the back plate 111 as shown in FIG. 1. In other words, the base and the abutting portion or portions of the support pin can be in any shape, such as circular shape, elliptic shape, arbitrary shape or others, and the base and the abutting portion or portions of the support pin can be designed as having suitable shapes and areas based on practical requirements. Specifically, the support pin is required to have a base 1132 to be fixed on the back plate and at least an abutting portion for clamping the reflector 112.

Reference is made to FIG. 1. In an embodiment of the present invention, the optical films 115 of the backlight module 110 include a light diffusing film 1152, an upper prism film 1154, and a lower prism film 1156. The light diffusing film 1152 comprises diffuser particles within resin film. The lights entered the light diffusing film 1152 will be diffused and spread out in different directions, so as to scatter the lights. The upper prism film 1154 and the lower prism film 1156 correct the directions of the lights to increase the amount of lights output to the display panel 120 and enhance the luminance of the display screen. The surfaces of the upper prism film 1154 and the lower prism film 1156 have micro prism structures, and the longitudinal directions of the micro prism structures on the upper prism film 1154 are substantially perpendicular to the longitudinal directions of the micro prism structures on the lower prism film 1156.

Figure 4A:
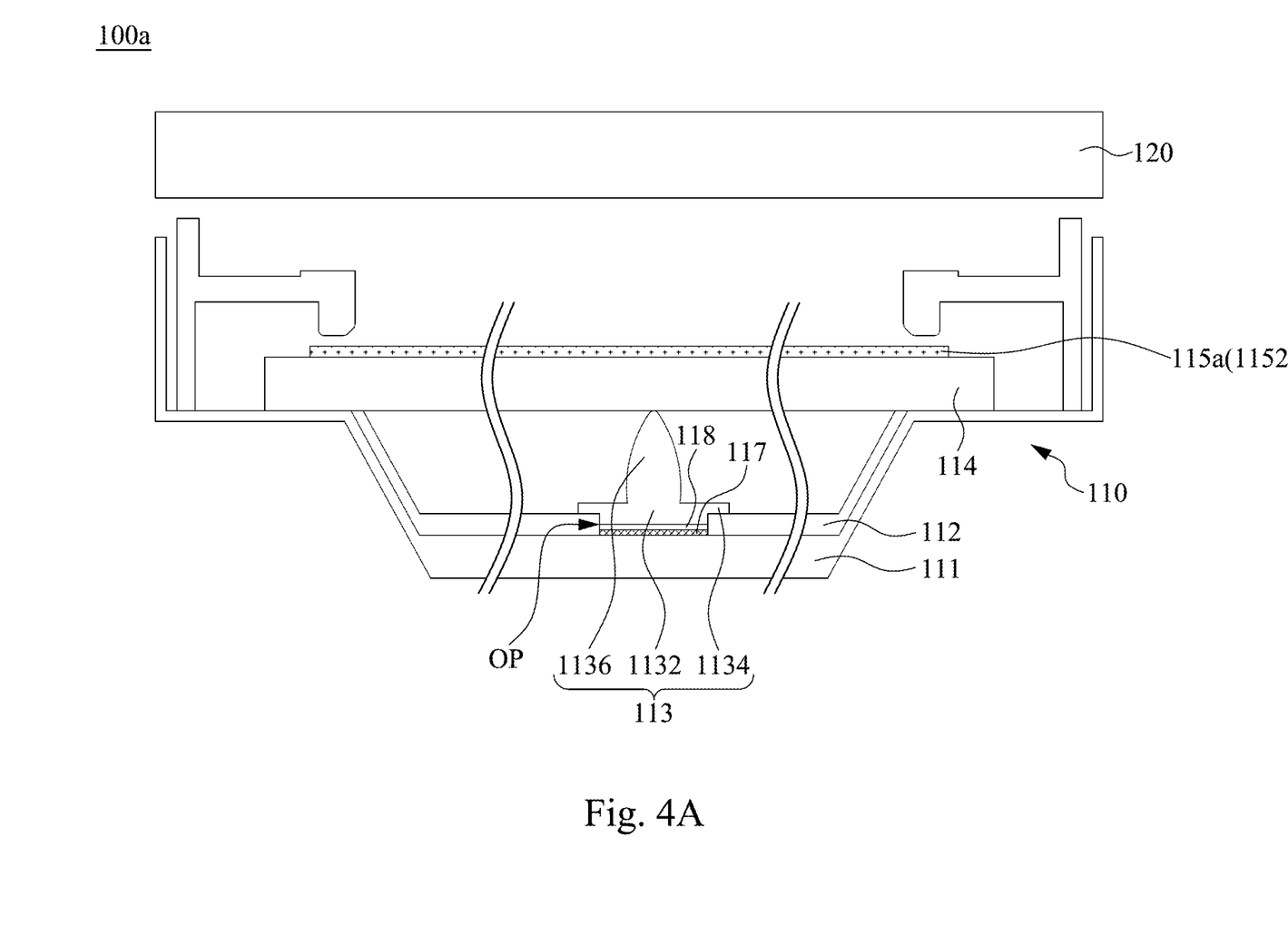
FIG. 4A and FIG. 4B are cross-sectional views of display devices according to different embodiments of the present invention.
Figure 4B:
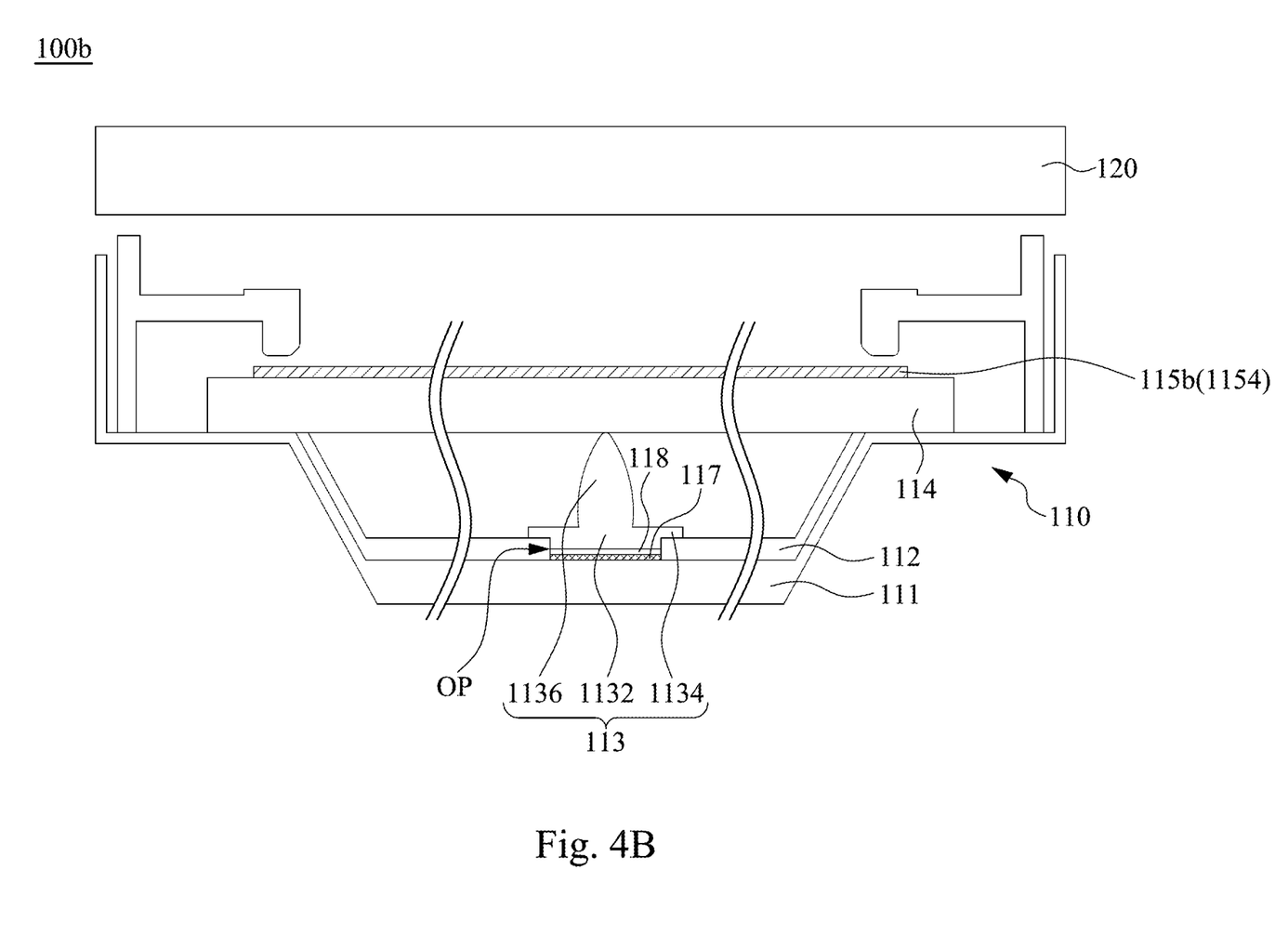

FIG. 4A and FIG. 4B are cross-sectional views of display devices according to different embodiments of the present invention. As shown in FIG. 4A, the display device 100a further includes a reflective layer 118. The reflective layer 118 is located on the bottom surface of the base 1132 facing the back plate 111. In the present embodiment, the optical film 115a includes a light diffusing film 1152 scattering the lights, but does not include an upper prism film and a lower prism film which increase the amount of lights output to the display panel 120. In other words, when the backlight module 110 of the display device 100a is only required to output lower luminance levels, the optical film 115a of the backlight module 110 may only include the light diffusing film 1152. Also, the combination of the reflective layer 118 and the transparent support pin 113 is utilized to increase the possibility that the lights are reflected to the light diffusing film 114 through the support pin 113. As a result, the undesired X-shaped mura and shadow on the displayed panel can be prevented, and the production cost can be further reduced according to the embodiment of the present invention.

As shown in FIG. 4B, the display device 100b is substantially the same as the display device 100a, wherein the difference is that the optical film 115b of the display device 100b includes an upper prism film 1154 which increases the amount of lights output to the display panel 120, but does not include a light diffusing film or a lower prism film. In other words, when the backlight module 110 of the display device 100b is required to output luminance levels higher than the backlight module 110 of the display device 100a, the optical film 115b of the backlight module 110 may only include the upper prism film. Also, the combination of the reflective layer 118 and the transparent support pin 113 is utilized to increase the possibility that the lights are reflected to the light diffusing film 114 through the support pin 113. As a result, the undesired X-shaped mura and shadow on the displayed panel can be prevented, and the production cost can be reduced. Specifically, the optical prism film 115b can be the lower prism film 1156 instead of the upper prism film 1154. The longitudinal directions of the micro prism structures on the upper or lower prism film in the embodiments of FIG. 4B can be determined and designed based on the material properties of the practical products.

Figure 5A:
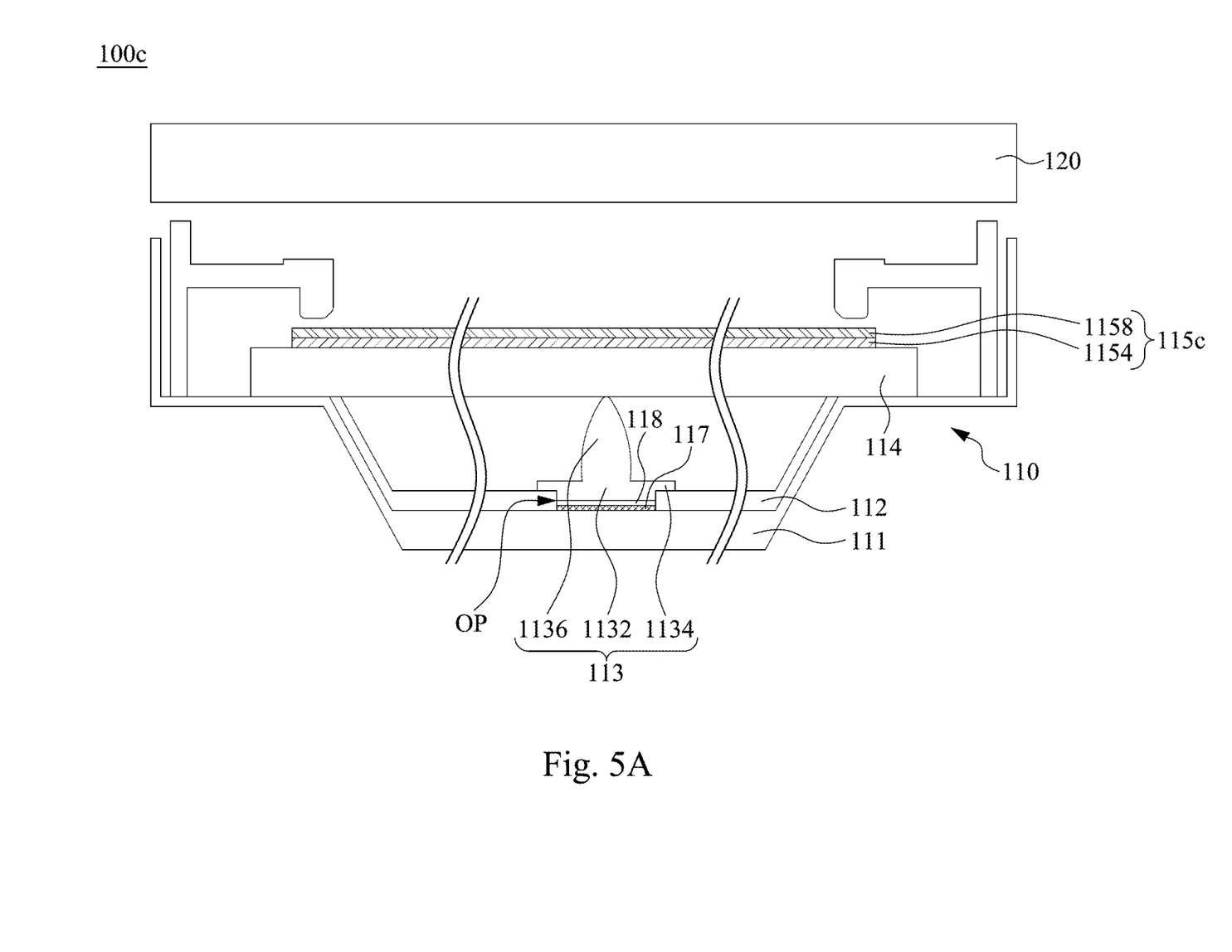
FIG. 5A to FIG. 5C are cross-sectional views of display devices according to different embodiments of the present invention.
Figure 5B:
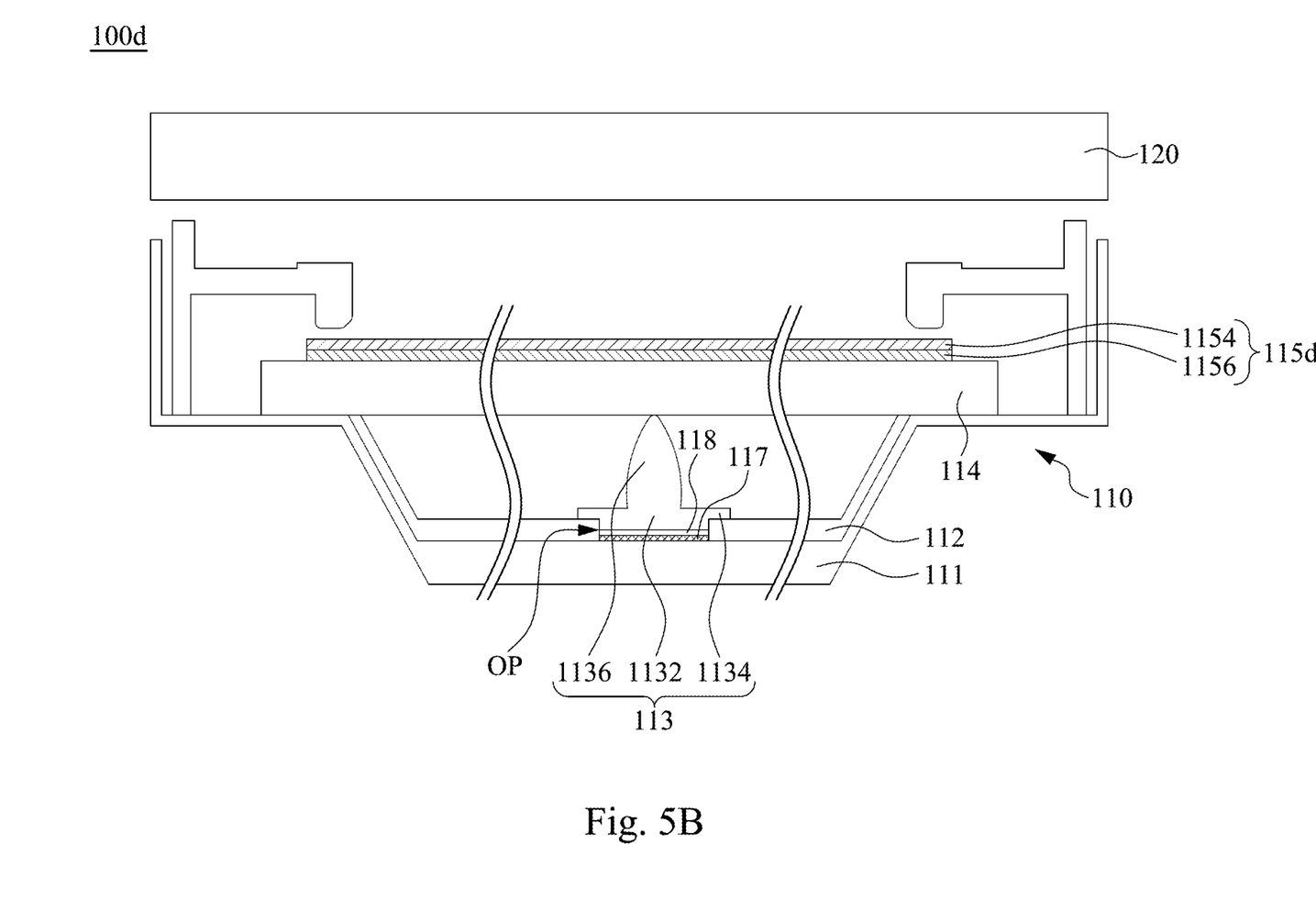
Figure 5C:
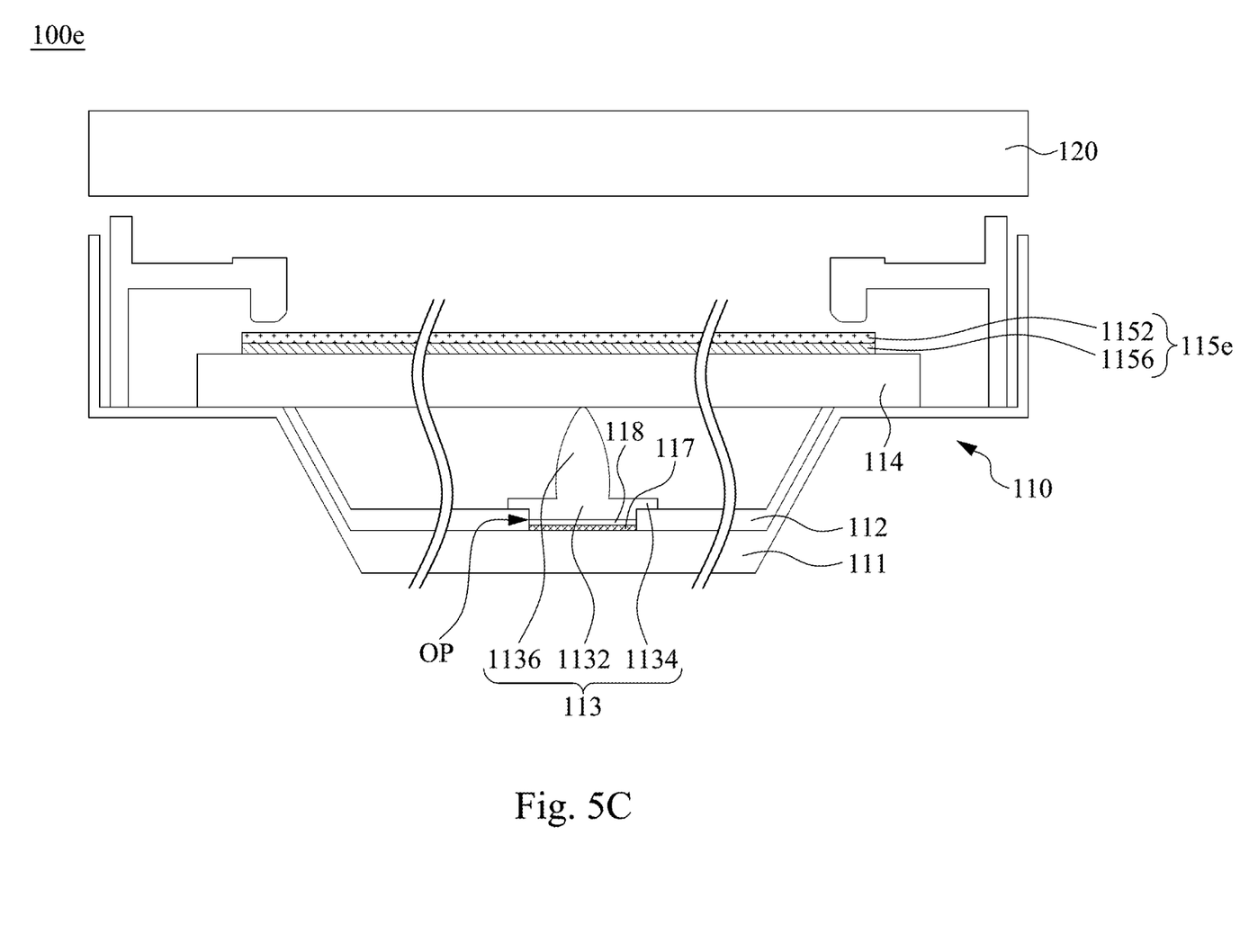

FIG. 5A to FIG. 5C are cross-sectional views of display devices according to different embodiments of the present invention. As shown in FIG. 5A, the display device 100c is substantially the same as the display device 100a shown in FIG. 4A, wherein the difference is that the optical film 115c of the display device 100c is a composite film, such as a Cyclo Olefin Polymer (COP) film that includes a dual brightness enhancement films (DBEF) layer 1158 and the upper prism layer 1154. As shown in FIG. 5B, the display device 100d is substantially the same as the display device 100c shown in FIG. 5A, wherein the difference is that the optical film 115d of the display device 100d is a composite film, such as a Prism On Prism (POP) film that includes the upper prism layer 1154 and the lower prism layer 1156. As shown in FIG. 5C, the display device 100e is substantially the same as the display device 100c shown in FIG. 5A, wherein the difference is that the optical film 115e of the display device 100e is a composite film, such as a Diffusor On Prism (DOP) film that includes the light diffusing layer 1152 and the lower prism layer 1156. The display devices in FIG. 5A to FIG. 5C have the similar advantages as the display device 100a shown in FIG. 4A or 4B, which utilizes a single optical film and the support pin 113 combined with the reflective layer 118 in the backlight module to achieve improved light distributions, and the description of the similar advantages is not repeated hereinafter. Since the optical film 115c-115e shown in FIG. 5A to FIG. 5C are single composite films instead of multiple optical films, the module assembling process can be simplified and the production efficiency of the display device 100c-100e can be improved. In addition, the overall thickness of the display device 100c-100e can be reduced and still maintain strong resistance to warpage.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module of a display device, comprising:
a back plate;
a light source disposed on the back plate;
a reflector disposed on the back plate and has an opening;
a support pin located in the opening and on the back plate, wherein the support pin comprises a base, an abutting portion, and a transparent supporting portion, the transparent supporting portion is on the base, the abutting portion protrudes outward from the base and extends onto the reflector, and the abutting portion and the base form a step structure;
a diffuser located on the transparent supporting portion; and
an optical film located on the diffuser;
wherein the reflector is located between the abutting portion of the support pin and the back plate, the base is between the abutting portion and the back plate, the base is surrounded by the reflector and fixed on a surface of the back plate, and the back plate does not have a through hole at a position corresponding to the base and the opening of the reflector.

2. The backlight module of the display device of claim 1, wherein the reflector is clamped by the abutting portion and is fixed on the back plate, and there is no adhesive material between the reflector and the back plate.

3. The backlight module of the display device of claim 1, wherein the abutting portion of the support pin surrounds the base.

4. The backlight module of the display device of claim 1, further comprising:
an adhesive layer disposed between the base and the back plate.

5. The backlight module of the display device of claim 1, wherein the support pin further comprises a reflective layer, and the reflective layer is located on a surface of the base facing the back plate.

6. The backlight module of the display device of claim 1, wherein the optical film is a light diffusing film or a prism film.

7. The backlight module of the display device of claim 1, wherein the optical film is a composite film, and the composite film comprises a first prism layer and one of a dual brightness enhancement films (DBEF) layer, a second prism layer, and a light diffusing layer.

8. A display device, comprising:
a backlight module, comprising:
a back plate;
a light source disposed on the back plate;
a reflector disposed on the back plate and has an opening;
a support pin located in the opening and on the back plate, wherein the support pin comprises a base, an abutting portion, and a transparent supporting portion, the transparent supporting portion is on the base, the abutting portion protrudes outward from the base and extends onto the reflector, and the abutting portion and the base form a step structure;
a diffuser located on the transparent supporting portion; and
an optical film located on the diffuser;
wherein the reflector is located between the abutting portion of the support pin and the back plate, the base is between the abutting portion and the back plate, the base is surrounded by the reflector and fixed on a surface of the back plate, and the back plate does not have a through hole at a position corresponding to the base and the opening of the reflector; and
a display panel, wherein the optical film and the diffuser are located between the display panel and the support pin.

9. The display device of claim 8, wherein the reflector is clamped by the abutting portion and is fixed on the back plate, and there is no adhesive material between the reflector and the back plate.

10. The display device of claim 8, further comprising:
an adhesive layer disposed between the base and the back plate.

11. The display device of claim 8, wherein the support pin further comprises a reflective layer, and the reflective layer is located on a surface of the base facing the back plate.

12. The display device of claim 8, wherein the optical film is a light diffusing layer or a prism film.

13. The display device of claim 8, wherein the optical film is a composite film, and the composite film comprises a first prism film and one of a dual brightness enhancement films (DBEF) layer, a second prism layer, and a light diffusing layer.

14. A backlight module of a display device, comprising:
a back plate;
a light source disposed on the back plate;
a reflector disposed on the back plate and has an opening;
a support pin located in the opening and on the back plate, wherein the support pin comprises a base, an abutting portion, a transparent supporting portion, and a reflective layer, the transparent supporting portion is on the base, the abutting portion protrudes outward from the base and extends onto the reflector, the abutting portion and the base form a step structure, and the reflective layer is located on a surface of the base facing the back plate;
a diffuser located on the transparent supporting portion; and
an optical film located on the diffuser;
wherein the reflector is located between the abutting portion of the support pin and the back plate.

* * * * *